United States Patent
Shin (10) Patent No.: US 8,755,836 B2
(45) Date of Patent: Jun. 17, 2014

(54) METHOD FOR SEARCHING THE LOCATION OF MULTI-SIM MOBILE TERMINAL AND AN APPARATUS THEREOF

(71) Applicant: Samsung Electronics Co., Ltd., Gyeonggi-do (KR)

(72) Inventor: Simon Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/726,996

(22) Filed: Dec. 26, 2012

(65) Prior Publication Data

US 2013/0203438 A1    Aug. 8, 2013

(30) Foreign Application Priority Data

Feb. 2, 2012    (KR) .................. 10-2012-0010713

(51) Int. Cl.
*H04W 24/00*    (2009.01)

(52) U.S. Cl.
USPC ................. 455/556.1; 455/456.5; 455/456.6; 455/552.1; 455/558

(58) Field of Classification Search
None
See application file for complete search history.

(56) References Cited

U.S. PATENT DOCUMENTS

| | | | |
|---|---|---|---|
| 5,504,684 A | 4/1996 | Lau et al. | |
| 6,145,748 A | 11/2000 | Neifer et al. | |
| 2004/0033727 A1 | 2/2004 | Kao | |
| 2004/0087213 A1 | 5/2004 | Kao | |
| 2005/0208815 A1 | 9/2005 | Tsai | |
| 2006/0282875 A1 | 12/2006 | Glatt et al. | |
| 2007/0086644 A1 | 4/2007 | Wilson et al. | |
| 2007/0096933 A1 | 5/2007 | Enitan et al. | |
| 2008/0167074 A1 | 7/2008 | Van Steenbergen | |
| 2009/0040196 A1 | 2/2009 | Duckstein et al. | |
| 2009/0047979 A1 | 2/2009 | Oh et al. | |
| 2009/0061932 A1 | 3/2009 | Nagarajan | |
| 2009/0325572 A1 | 12/2009 | Ji | |
| 2010/0069118 A1 | 3/2010 | Wang | |
| 2010/0120435 A1 | 5/2010 | Mia et al. | |
| 2010/0208649 A1 | 8/2010 | Chang et al. | |
| 2011/0009132 A1 | 1/2011 | Skarby et al. | |
| 2011/0077003 A1 | 3/2011 | Shin | |
| 2011/0081951 A1 | 4/2011 | Hwang | |
| 2013/0143593 A1* | 6/2013 | Wirola et al. .............. | 455/456.1 |

FOREIGN PATENT DOCUMENTS

EP    1030531 A1    8/2000
GB    2383215 A    6/2003

* cited by examiner

*Primary Examiner* — Suhail Khan
(74) *Attorney, Agent, or Firm* — Cha & Reiter, LLC (57) ABSTRACT

A method, apparatus and system for determining a location of a multi-Subscriber Identification Module (SIM) mobile terminal having at least first and second SIMs mounted therein are provided. The first and second SIMs are associated with respective first and second mobile networks using different base stations. A first location is determined based on a location of at least one first base station in the first network and receive signal strength at the mobile terminal of a signal transmitted by the at least one first base station. A second location is determined based on a location of at least one second base station in the second network associated with the second SIM and receive signal strength at the mobile terminal of a signal transmitted by the at least one second base station. The location of the mobile terminal is then estimated from the first and second locations.

19 Claims, 4 Drawing Sheets

METHOD FOR SEARCHING THE LOCATION OF MULTI-SIM MOBILE TERMINAL AND AN APPARATUS THEREOF

CLAIM OF PRIORITY

This application claims the benefit under 35 U.S.C. §119 (a) of a Korean patent application filed in the Korean Intellectual Property Office on Feb. 2, 2012 and assigned Serial No. 10-2012-0010713, the entire disclosure of which is hereby incorporated by reference.

BACKGROUND

1. Technical Field

This disclosure relates generally to a method and apparatus for searching a location of a mobile terminal, and in particular, for searching and recognizing a location of a multi-Subscriber Identification Module (SIM) mobile terminal

2. Description of the Related Art

As is well known, mobile terminals developed for the purpose of using mobile communication services are widely used and considered by many as a necessity of everyday life. Today's mobile terminals have increased functionality which additionally provide a computer-based function such as Internet communication, information search, etc., and can install an application desired by a user. In particular, a service for recognizing a location of the mobile terminal and for additionally having an application related thereto, that is, a location-based service, is frequently utilized, and is variously utilized throughout everyday life.

The location-based service includes various services such as a weather service for a region where a mobile phone is located, a traffic information service capable of finding a shortcut, a consumer information service for finding a nearby entity such as a department store, medical center, theater, restaurant, or the like, a telematics service for providing information while travelling, etc.

It is desirable for the location-based service to determine a location of the mobile terminal with high accuracy. In general, a network scheme for using strength of radio waves and cell information including a base station identifier (or a cell identifier (ID)) or a Global Positioning System (GPS) scheme for utilizing a satellite navigator is used to recognize the location of the mobile terminal The network scheme is a simple network-based positioning technique that does not require additional devices such as satellites or a satellite receiver at the mobile terminal. Thus the network scheme has an advantage of simplicity but a disadvantage in that its accuracy is lower than that of the GPS scheme.

A multi-SIM mobile terminal employing a plurality of Subscriber Identification Modules (SIMs) has recently been manufactured. The SIM stores personal information capable of providing various services of a mobile communication vendor, such as subscriber authentication, accounting, and security functions. As a result, the multi-SIM mobile terminal can provide services of a plurality of mobile communication vendors.

In general, if a location of the multi-SIM mobile terminal is recognized by using the network scheme, cell information of a mobile network is used through only one SIM currently in use.

Figure 1:
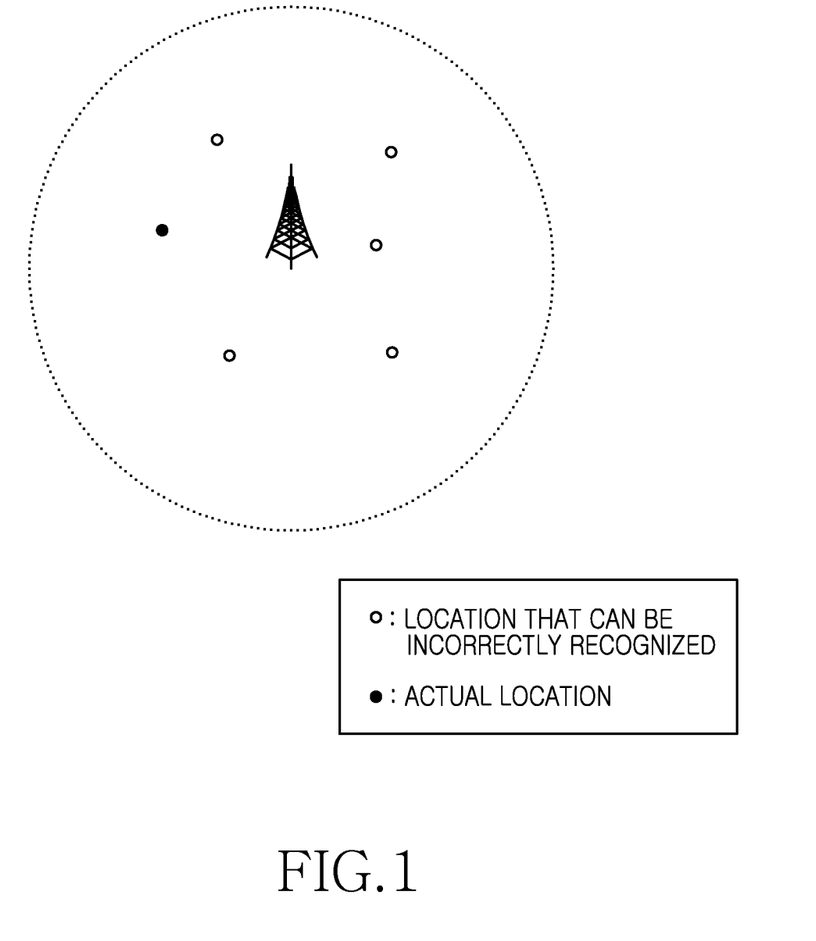
FIG. 1 illustrates a conventional method of recognizing a location of a multi-Subscriber Identification Module (SIM) mobile terminal.

FIG. 1 illustrates a conventional method of recognizing a location of a multi-SIM mobile terminal. As illustrated, if a communication state of a mobile network associated with one of the SIMs is poor, the estimated location of the multi-SIM mobile terminal may be inaccurate. For instance, excessive noise, low signal level, or interfering signals may inhibit the ability to correctly determine distance of the mobile terminal from the serving base station, leading to erroneous calculations. Accuracy of location information may significantly vary depending on a size of a cell radius. Thus a need exists to address these problems and provide a way to obtain reliable location information for multi-SIM modules in a network based scheme.

SUMMARY

An aspect of the present invention is to solve at least the above-mentioned problems and/or disadvantages and to provide at least the advantages described below. Accordingly, an aspect of the present invention is to provide a method and apparatus for recognizing a location of a multi-Subscriber Identification Module (SIM) mobile terminal without an additional device for recognizing the location, for example, a Global Positioning System (GPS) receiver.

In accordance with exemplary embodiments, a method, apparatus and system for determining a location of a multi-Subscriber Identification Module (SIM) mobile terminal having at least first and second SIMs mounted therein are provided. The first and second SIMs are associated with respective first and second mobile networks using different base stations. A first location is determined based on a location of at least one first base station in the first network and receive signal strength at the mobile terminal of a signal transmitted by the at least one first base station. A second location is determined based on a location of at least one second base station in the second network associated with the second SIM and receive signal strength at the mobile terminal of a signal transmitted by the at least one second base station. The location of the mobile terminal is then estimated from the first and second locations.

The estimated location may be determined as a middle point of the first and second locations.

The at least one first base station in the first mobile network may be a serving first base station and at least one neighboring first base station. In this case, the first location is determined as a function of locations of the serving first base station and the at least one neighboring first base station in conjunction with received signal strengths at the mobile terminal of signals transmitted by the serving first base station and the at least one neighboring first base station. Similarly, the second location may be determined based on locations of a second serving base station and at least one neighboring second base station in conjunction with receive signal strengths thereof.

The determination of the first and second locations may be performed by first and second servers in the first and second networks, respectively. In this case, the mobile terminal transmits the relevant receive signal strengths to the servers, which use pre-stored location information of the corresponding base stations to compute the respective first and second locations. The mobile terminal may transmit base station identifiers (received from the base stations) along with the receive signal strengths to the respective servers, where the servers correlate the identifiers to base station location information in a database.

In an alternative implementation, instead of estimating the location from the first and second locations, the mobile terminal may select cell information of one of the first and second networks in which communication quality is superior to estimate the mobile terminal location. For instance, if the second network is determined to have better communication quality, the location is determined based on the locations of the second serving base station and at least one neighboring second base station in conjunction with the receive signal strengths of only these second base stations.

The mobile terminal may further include the capability of using GPS location determination. Further, if the first and second SIMs are determined to be operative in a common network, the location may be estimated using receive signal strengths and base station locations associated with only one of the SIMs.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Exemplary embodiments of the present invention will be described herein below with reference to the accompanying drawings. In the following description, well-known functions or constructions are not described in detail since they would obscure the invention in unnecessary detail. Also, terms used herein should be understood in the context of the description of the exemplary embodiments Terms used may vary depending on user or operator intent and usage.

Embodiments described herein relate to a method, apparatus and system for determining a location of a multi-Subscriber Identification Module (SIM) mobile terminal by using cell information including strength of radio waves of at least one base station and a base station identifier (or a cell identifier (ID)).

Embodiments herein provide a method, apparatus and system for estimating a location of a multi-SIM mobile terminal more accurately by receiving a location in a serving cell from each of two or more mobile networks serving the mobile terminal through two or more respective SIMs of the multi-SIM mobile terminal When the SIMs are associated with different mobile networks, location information of the mobile terminal is estimated in one embodiment via cell information in each mobile network to obtain two or more estimated locations. These locations can then be averaged to more accurately obtain a final estimate. In an alternative implementation, only one of the mobile networks having better communication quality conditions is selected for estimating the location of the mobile terminal.

Figure 2:
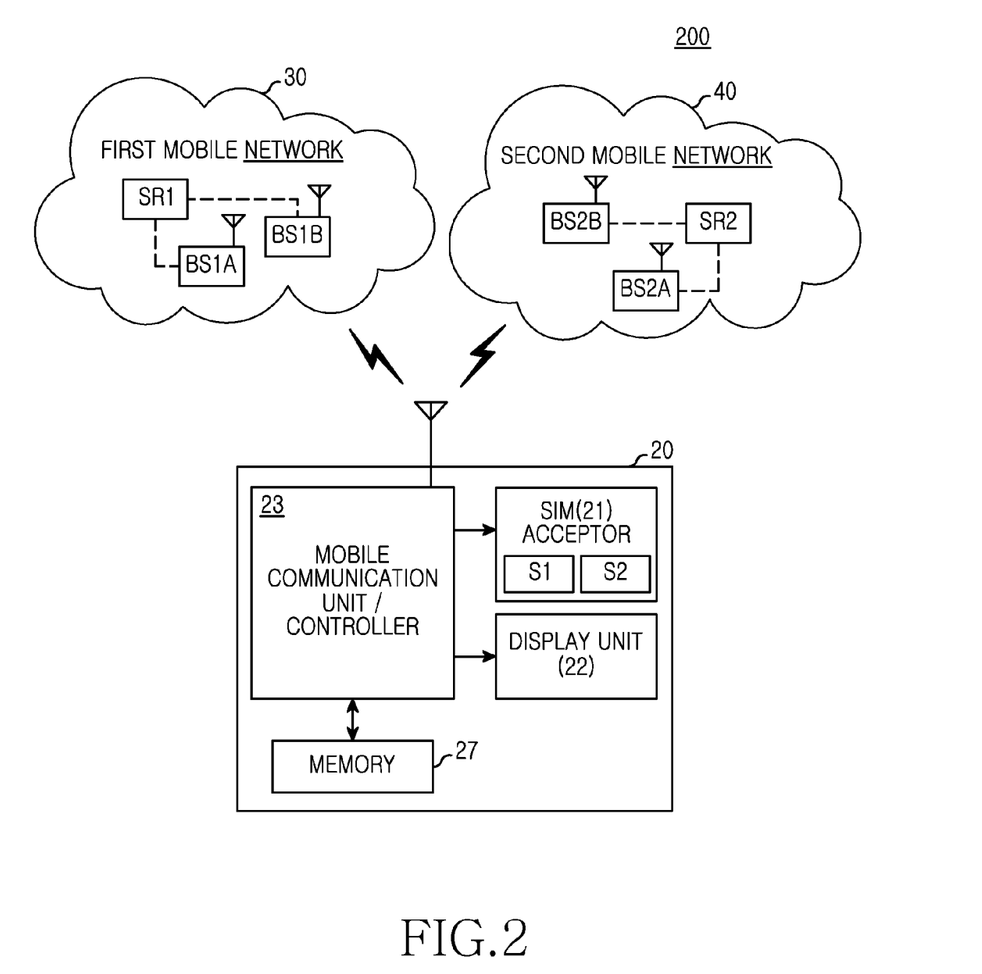
FIG. 2 is a block diagram illustrating a structure of a system for estimating a location of a multi-SIM mobile terminal according to an exemplary embodiment of the present invention.

FIG. 2 is a block diagram illustrating a structure of a system, 200, for estimating a location of a multi-SIM mobile terminal according to an exemplary embodiment of the present invention. System 200 includes a multi-SIM mobile terminal 20 and mobile networks 30 and 40 operated by at least one mobile communication vendor for providing a mobile communication service to the multi-SIM mobile terminal 20.

The mobile terminal 20 is a portable wireless communication apparatus that cooperates with the mobile network to exchange data, and may be a mobile phone, a Personal Digital Assistant (PDA), a Portable Multimedia Player (PMP), a navigation device, etc. The mobile terminal 20 includes a SIM acceptor 21 within which a plurality of SIMs S1, S2 are removably attached. A mobile communication unit/controller 23 (hereafter referred to as just mobile communication unit 23) controls overall operations of the mobile terminal 20 and enables communication using the mobile network provided from the mobile communication vendor through each SIM. A display unit 22 outputs display information under the control of the mobile communication unit 23. The mobile terminal 20 may also include a GPS receiver (not shown). The user may be given the option of using the GPS receiver for location determination, and for turning off the GPS receiver, whereby a network location determination scheme according to the invention is used as described below. As a further option, the network scheme to be described may be used only when GPS signals are deemed to be unavailable or unsuitable.

For example, the mobile communication unit 23 is communicates with a first mobile network 30 through a first SIM 51, and with a second mobile network 40 through a second SIM S2. The first and second networks 30, 40 may be operated by different vendors, and may use different communication technologies. For instance, SIMs S1 and S2 can be used to provide different mobile phone numbers and/or different communication functions to the mobile terminal 20.

The mobile communication unit 23 cooperates with the mobile network to exchange cell information through radio waves from a serving cell which is a base station to which the mobile communication unit 23 is currently connected (camped or in active communication). Optionally, the mobile terminal concurrently receives and measures the signal strength of a radio signal such as a pilot channel signal from a neighbor cell which is a base station adjacent to the serving cell. Accordingly, the mobile communication unit 23 receives a radio wave from at least one base station, i.e., the serving cell and preferably one or more neighboring cells. Herein, the cell is an area of a wider service region divided in a cell pattern. A compact Transmit (Tx) power base station is installed in a unit of cell. The cell defines a relatively narrow service area in which mobile terminals are capable of receiving a radio service from one base station.

The mobile communication unit 23 is an element for receiving a signal transmitted from the aforementioned serving cell and optional neighbor cell, and can be configured with a Radio Frequency (RF) module capable of receiving radio waves modulated with only a single technology or with differing technologies such as 3G and 4G technologies. Further, the mobile communication unit 23 collects cell information including a base station identifier of the base station. Mobile communication unit 23 is further adapted to measure signal strength of the base station radio waves transmitted in either a pilot channel or traffic channel. The signal strength measurement may further take into account noise, bit error ratio, etc. to obtain a measure of the quality of the communication channel. The base station identifier may be a unique identifier (ID) assigned to each base station.

The mobile communication unit 23 collects "cell information" which includes the base station identifier of the cell associated with each base station, and the measured receive signal strength of radio waves from the base station. The base station identifier is obtained from the base station radio waves, typically in a pilot channel. Preferably, cell information is also periodically collected from at least one neighboring cell adjacent to the serving cell to which the mobile terminal is currently connected; this information may be stored separately in a memory 27.

The mobile communication unit 23 may transmit the collected cell information to a corresponding mobile network. The mobile networks 30 and 40 each include a server which receives the cell information from the multi-SIM mobile terminal 10, obtains a location of the multi-SIM mobile terminal from the received cell information, and transmits the obtained location to the mobile communication unit 23.

In one example, the first network 30 serves mobile terminals via a plurality of base stations such as BS1A, BS1B which are communicatively coupled to at least one server SR1. Server SR1 calculates a current location (first location) for mobile terminal 20 based on receive signal strengths at the mobile terminal 20 of signals transmitted by base stations BS1A and BS1B. For instance, server SR1 consults a database to ascertain the precise locations of base stations BS1A and BS1B (where BS1A is a currently serving base station for mobile terminal 20 and BS1B is a neighboring base station), by correlating base station identifiers with location information. Server SR1 knows which base stations correspond to the receive signal strength measurements by mobile terminal 20 by receiving the base station identifiers from the mobile terminal 20 (or from the base stations themselves as the base stations route the signal strength measurement data to the servers). Server SR1 also knows the absolute power transmitted by base stations BS1A and BS1B, based on predetermined information stored in the database, or based on periodic updates from the base stations. Server SR1 can then estimate the distance between the mobile terminal 20 and the serving base station BS1A based on the difference between the absolute power transmitted by base station BS1A and the signal strength received at mobile terminal 20 (calibrated for its antenna gain as well as the antenna gain of the base station antenna). When this is done only for the serving base station, the mobile terminal position is estimated as a radius equaling the estimated distance. Preferably, another radius is obtained for at least one neighboring base station BS1B in the same manner. The first location is then estimated at the point of intersection of the radii around the serving base station BS1A and the neighboring base station BS1B; and this first location is transmitted to the mobile terminal 20.

Similarly, the second mobile network 40 serves mobile terminals via a plurality of different base stations such as BS2A, BS2B coupled to at least one server SR2. Server SR2 may concurrently calculate a location (second location) of the mobile terminal 20 based on receive signal strengths at the mobile terminal 20 of signals transmitted by base stations BS2A and BS2B. This second location is then transmitted to the mobile terminal 20, which may then estimate a final location as a midpoint between the first and second locations.

In an alternative design, the mobile terminal 20 performs all the location calculations for the first and second locations as well as the midpoint of these locations, such that servers SR1 and SR2 are not needed. This design may be implemented by means of the base stations providing their precise locations and absolute power levels (calibrated for base station antenna gains) to the mobile terminal 20 in a suitable control channel. The mobile communication unit 23 can then perform the calculations otherwise performed by the servers SR1 and SR2 to obtain the first and second locations, and thereafter calculate the midpoint of the two locations to arrive at a more accurate location estimate.

In another embodiment, instead of estimating the location from the first and second locations, the mobile terminal may select cell information of one of the first and second networks in which communication quality is superior, to estimate the mobile terminal location. For instance, if the second network is determined to have better communication quality (e.g., less noise or a significantly stronger signal), the location can be determined as just the second location. As in the embodiment discussed above, the second location is determined based on the locations of the second serving base station BS2A and at least one neighboring second base station BS2B in conjunction with the receive signal strengths of only these second base stations. In this case, there is no need to transmit cell information to the first server SR1. This embodiment may be implemented via server SR2 determining the second location, or alternatively by the mobile terminal 20 performing all the location calculations without transmitting cell information to server SR2, in the manner described above for the alternative design.

It is also possible for the plurality of SIMs S1, S2 to be SIMs provided by the same mobile communication vendor for use in a common mobile network. For instance, SIMs S1 and S2 could each be configured for use in the first mobile network 30 but not in the second mobile network 40. In this case, SIMs S1, S2 could be used to provide different mobile phone numbers to mobile terminal 20, and/or for different communication functions. Location would then be determined based on the location information of the base stations BS1A, BS1B in the first network in conjunction with the receive signal strengths at the mobile terminal 20.

Figure 3:
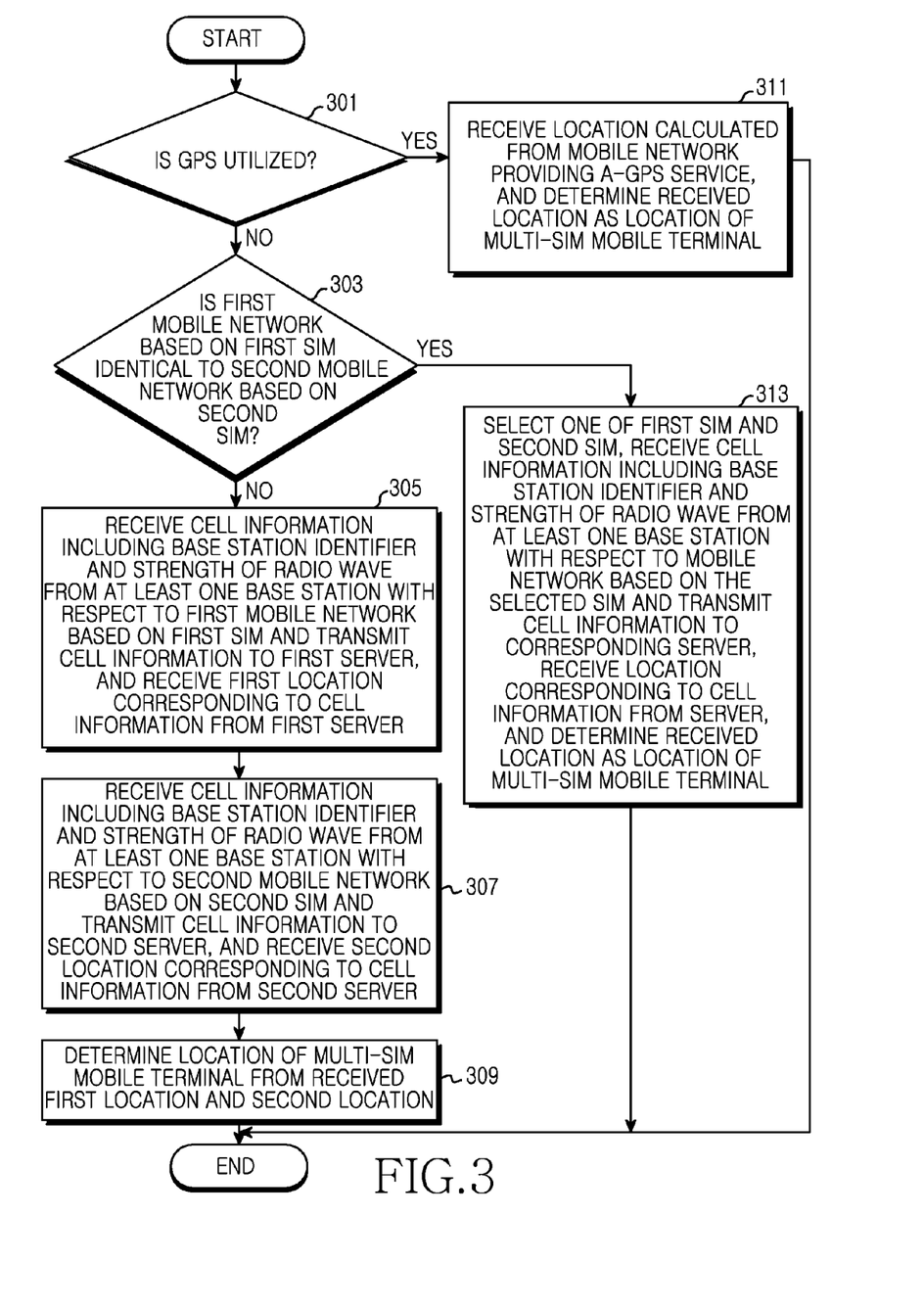
FIG. 3 is a flowchart of a process for estimating a location of a multi-SIM mobile terminal according to an exemplary embodiment of the present invention.

FIG. 3 is a flowchart of a process for recognizing a location of a multi-SIM mobile terminal according to an exemplary embodiment of the present invention. In this process, mobile communication unit 23 determines whether a GPS is utilized to recognize the location in step 301. As mentioned above, a GPS location determining mode may be unavailable if a GPS option is switched off by a user control, or if suitable GPS signals are not received. If the GPS is not utilized, proceeding to step 303, the mobile communication unit 23 determines whether the first mobile network based on the first SIM is identical to the second mobile network based on the second SIM. (Herein, when the first and second mobile networks are determined to be identical, this means the mobile network is a common network. That is, the first and second networks are to be considered a single network using the same base stations and at least one common server.)

If it is determined in step 301 and 303 that the GPS is not utilized and the first mobile network based on the first SIM is different from the second mobile network based on the second SIM, proceeding to step 305, the mobile communication unit 23 receives cell information including a base station identifier and strength of radio waves from at least one base station with respect to the first mobile network based on the first SIM and transmits the cell information to a first server, and receives a first location corresponding to the cell information from the first server.

In step 307, the mobile communication unit 23 receives the cell information including the base station identifier and the strength of radio waves from at least one base station with respect to the second mobile network based on the second SIM, transmits the cell information to a second server, and receives a second location corresponding to the cell information from the second server.

In step 309, the mobile communication unit 23 determines the location of the multi-SIM mobile terminal from the received first location and second location (i.e., if both the first and second locations are provided. For example, the mobile communication unit 23 may determine a middle point of the first location and the second location as the location of the multi-SIM mobile terminal Alternatively, if it is determined that the communication quality of one of the first mobile network is poor (below a predetermined threshold) but that of the second mobile network is satisfactory, only the second location may be used as the final estimated location (and vice versa).

If it is determined in step 301 and step 303 that the GPS is not utilized and the first mobile network based on the first SIM is equivalent to the second mobile network based on the second SIM, proceeding to step 313, the mobile communication unit 23 selects one of the first SIM and the second SIM, receives cell information including a base station identifier and strength of radio waves from at least one base station with respect to a mobile network based on the selected SIM, and transmits the cell information to a corresponding server. Thereafter, the mobile communication unit 23 receives a location corresponding to the cell information from the server, and determines the received location as the location of the multi-SIM mobile terminal.

If it is determined in step 301 that the GPS is utilized, proceeding to step 311, the mobile communication unit 23 identifies a mobile network which provides an Assisted GPS (A-GPS) server between the first mobile network based on the first SIM and the second mobile network based on the second SIM, and transmits GPS satellite information confirmed on the basis of information of an occupied base station to the mobile network for providing the A-GPS service. Thereafter, the mobile communication unit 23 receives a location corresponding to the GPS satellite information from the mobile network which provides the A-GPS service, and determines the received location as the location of the multi-SIM mobile terminal.

In an alternative embodiment, if (1) the GPS is not utilized, (2) the first and second networks are different, and (3) quality of signal transmission and reception through the second mobile network is below a quality threshold, then location determination is performed using only cell information of the first network (and vice versa if the first network quality is below a threshold while the second network quality is above the threshold.). That is, the mobile communication unit 23 receives the cell information including the base station identifier and the strength of radio waves from at least one base station with respect to the first mobile network and transmits the cell information to the first server. Thereafter, the mobile communication unit 23 performs an operation for receiving a location corresponding to the cell information from the first server and for determining the received location as the location of the multi-SIM mobile terminal. That is, in this implementation, the mobile communication unit 23 selects only one of the mobile networks of which signal transmission and reception have relatively good quality. For example, when the mobile terminal is located near a boundary of two cells, quality of signal transmission and reception can deteriorate at the occurrence of a ping-pong situation in which a call is delivered repetitively forwards and backwards between two base stations. This may present a scenario in which it is beneficial to use only the mobile network providing better quality for location determination.

As mentioned earlier, as an alternative to the first and second locations being determined by the first and second servers, respectively, they may be determined by the mobile terminal 20. This can be done by provisioning the system to transmit the precise base station location information to the mobile terminal along with absolute powers transmitted by the relevant base stations calibrated for base station antenna gains. In this embodiment, the mobile terminal 20 need not transmit cell information to the servers.

Figure 4:
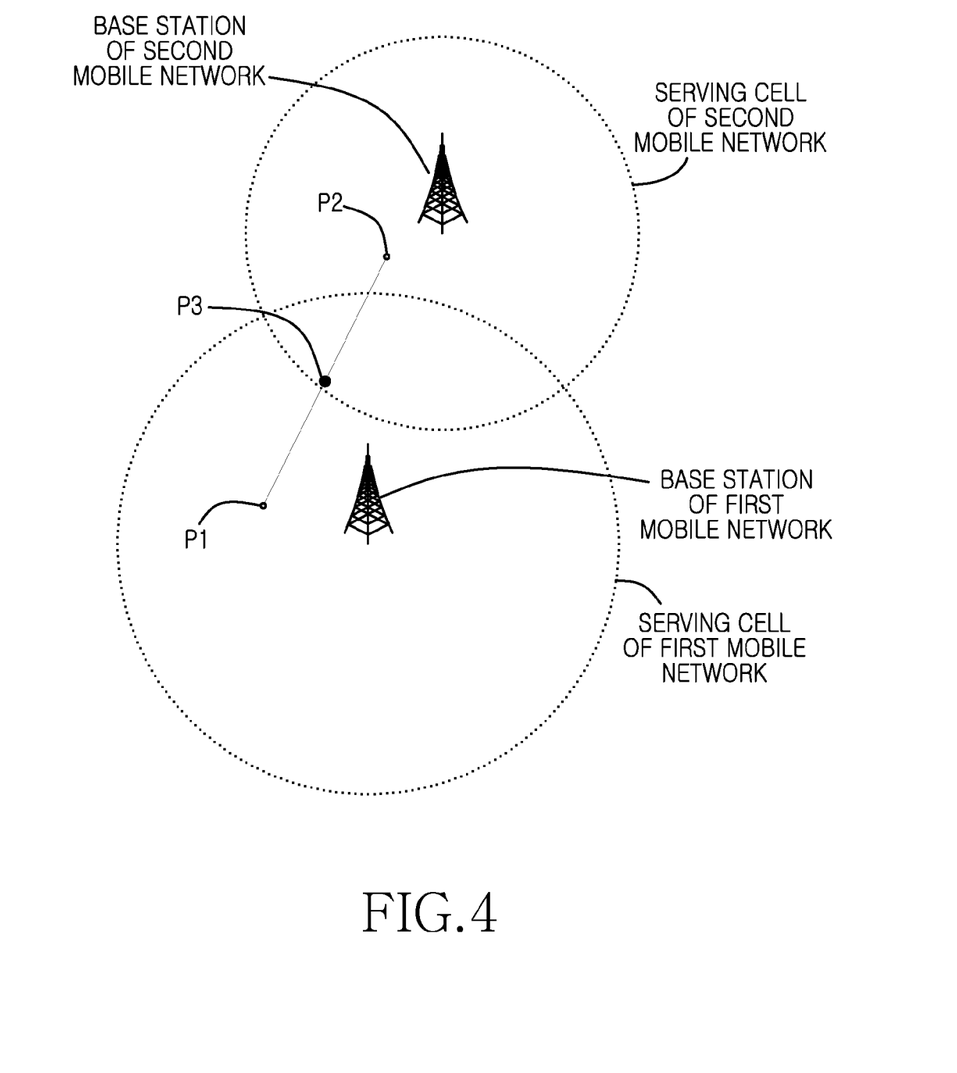
FIG. 4 illustrates a midpoint determination process for estimating a mobile terminal location according to an exemplary embodiment of the present invention.

FIG. 4 illustrates a midpoint determination process for estimating a location of a multi-SIM mobile terminal according to an exemplary embodiment of the present invention. With this technique, the mobile communication unit 23 operates according to the following procedure if the GPS is not utilized and the first mobile network based on the first SIM is different from the second mobile network based on the second SIM.

The mobile communication unit 23 receives cell information including a base station identifier and strength of radio waves from at least one base station with respect to the first mobile network. The first server of the first mobile network obtains a serving cell and a location P1 in the serving cell from the cell information, and transmits the obtained location P1 to the mobile communication unit 23. Further, the mobile communication unit 23 receives the cell information including the base station identifier and the strength of radio waves from at least one base station with respect to the second mobile network, and transmits the cell information to the second server. The second server of the second mobile network obtains a serving cell and a location P2 in the serving cell from the cell information, and transmits the obtained location P2 to the mobile communication unit 23.

The mobile communication unit 23 determines the location of the multi-SIM mobile terminal from the received locations P1 and P2 by applying a pre-set algorithm. For example, a middle point of the two locations P1 and P2 can be determined as the location of the mobile terminal In conclusion, the present invention can more accurately estimate the location of the mobile terminal by receiving the location in the serving cell from respective mobile networks allowed for a plurality of SIMs of the multi-SIM mobile terminal.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of determining a location of a multi-Subscriber Identification Module (SIM) mobile terminal having at least first and second SIMs mounted therein, the method comprising:
    ascertaining whether the first and second SIMs are associated with a common mobile network or with different mobile networks, and if associated with different mobile networks:
    determining a first location based on a location of at least one first base station in a first network associated with the first SIM and receive signal strength of a signal transmitted by the at least one first base station;
    determining a second location based on a location of at least one second base station in a second network associated with the second SIM and receive signal strength of a signal transmitted by the at least one second base station; and
    estimating the location of the multi-SIM mobile terminal from the first and second locations; and
    if the first and second SIMs are associated with the common network, estimating the location of the multi-SIM mobile terminal based on receive signal strength of a signal transmitted by at least one base station in the common network and a location of the at least one base station in the common network.

2. The method of claim 1, wherein if the first and second SIMs are associated with different mobile networks, the estimated location is determined as a middle point of the first location and the second location.

3. The method of claim 1, wherein said determining a first location, determining a second location and estimating the location are performed subsequent to a determination that GPS will not be utilized to estimate the location of the mobile terminal.

4. The method of claim 1, wherein if the first and second SIMs are associated with different mobile networks, further comprising:
    transmitting, by the mobile terminal, the receive signal strength of the at least one first base station signal to a first server operating in the first network, the first location then being determined by the first server;
    receiving, by the mobile terminal, the first location determined and transmitted by the first server;
    transmitting, by the mobile terminal, the receive signal strength of the at least one second base station signal to a second server operating in the second network, the second location then being determined by the second server; and
    receiving, by the mobile terminal, the second location determined and transmitted by the second server;
    wherein the estimating the location of the mobile terminal is performed at the mobile terminal from the received first and second locations.

5. The method of claim 4, wherein the first and second servers each determine the location of the respective at least one first base station and at least one second base station by correlating base station identifiers thereof with location information in a database.

6. The method of claim 1, further comprising activating a GPS location determination process comprising:
    identifying a mobile network for providing an Assisted GPS (A-GPS) service between the first mobile network based on the first SIM and the second mobile terminal based on the second SIM;
    transmitting GPS satellite information confirmed based on information of an occupied base station to a mobile network for providing the A-GPS service, and receiving a location corresponding to the GPS satellite information from the mobile network for providing the A-GPS service; and
    determining the location received through the mobile network for providing the A-GPS service as the location of the multi-SIM mobile terminal.

7. The method of claim 1, wherein,
    the at least one first base station in the first mobile network comprises a serving first base station and at least one neighboring first base station, the first location being determined as a function of locations of the serving first base station and the at least one neighboring first base station in conjunction with received signal strengths of signals transmitted by the serving first base station and the at least one neighboring first base station; and
    the at least one second base station in the second mobile network comprises a serving second base station and at least one neighboring second base station, the second location being determined as a function of locations of the serving second base station and the at least one neighboring second base station in conjunction with received signal strengths of signals transmitted by the serving second base station and the at least one neighboring second base station.

8. An apparatus for determining a location of a multi-Subscriber Identification Module (SIM) mobile terminal, the apparatus comprising:
    a SIM acceptor within which at least first and second SIMs are mounted; and
    a mobile communication unit coupled to the SIM acceptor and configured to ascertain whether the first and second SIMs are associated with a common mobile network or with different mobile networks, and if associated with different mobile networks, to: i) receive or determine a first location based on a location of at least one first base station in a first network associated with the first SIM and receive signal strength of a signal transmitted by the at least one first base station; ii) receive or determine a second location based on a location of at least one second base station in a second network associated with the second SIM and receive signal strength of a signal transmitted by the at least one second base station; and iii) estimate the location of the mobile terminal from the first and second locations;
    wherein the mobile communication unit is further configured to estimate the location of the multi-SIM mobile terminal based on receive signal strength of a signal transmitted by at least one base station in the common network and a location of the at least one base station in the common network when it is ascertained that the first and second SIMs are associated with the common network.

9. The apparatus of claim 8, wherein if the first and second SIMs are associated with different mobile networks, the mobile communication unit determines a middle point of the first location and the second location as the estimated location of the multi-SIM mobile terminal.

10. The apparatus of claim 8, wherein the mobile communication unit receives or determines the first location, receives or determines the second location and estimates the location of the mobile terminal subsequent to a determination that GPS will not be utilized to estimate the location of the mobile terminal.

11. The apparatus of claim 8, wherein if the first and second SIMs are associated with different mobile networks, the mobile communication unit is further operative to:
    transmit the receive signal strength of the at least one first base station signal to a first server operating in the first network, the first location then being determined by the first server;
    receive the first location determined and transmitted by the first server;
    transmit the receive signal strength of the at least one second base station signal to a second server operating in the second network, the second location then being determined by the second server;
    receive the second location determined and transmitted by the second server; and
    estimate the location of the mobile terminal from the received first and second locations.

12. The apparatus of claim 11, wherein the mobile communication unit is further operative to transmit base station identifiers to the first and second servers to enable the first and second servers to correlate the identifiers with base station location information stored in a database and thereby determine the first and second locations.

13. The apparatus of claim 8, wherein the mobile communication unit is further configured to control location estimation of the mobile terminal in a GPS mode in which a mobile network is identified for providing an A-GPS service between the first mobile network based on the first SIM and the second mobile network based on the second SIM, transmit GPS satellite information confirmed based on information of an occupied base station to a mobile network for providing the A-GPS service and receives a location corresponding to the GPS satellite information from the mobile network for providing the A-GPS service, and determines the location received through the mobile network for providing the A-GPS service as the location of the multi-SIM mobile terminal.

14. The apparatus of claim 8, wherein,
    the at least one first base station in the first mobile network comprises a serving first base station and at least one neighboring first base station, the mobile communication unit measures receive signal strengths of signals of the serving first base station and of the at least one neighboring base station, the first location being determined as a function of locations of the serving first base station and the at least one neighboring first base station in conjunction with the received signal strengths; and
    the at least one second base station in the second mobile network comprises a serving second base station and at least one neighboring second base station, the mobile communication unit measures receive signal strengths of signals of the serving second base station and of the at least one neighboring second base station, the second location being determined as a function of locations of the serving second base station and the at least one neighboring second base station in conjunction with the received signal strengths of the signals transmitted by the serving second base station and the at least one neighboring second base station.

15. A location determining system comprising:
    a first mobile network including a first server configured to correlate base station identifiers with location information of base stations operating in the first mobile network;
    a second mobile network including a second server configured to correlate base station identifiers with location information of base stations operating in the second mobile network;
    a multi-Subscriber Identification Module (SIM) mobile terminal configured to:
        determine whether (a) a GPS location determining mode is unavailable and (b) whether first and second SIMs mounted therein are associated with the first and second mobile networks, respectively, and if conditions of (a) and (b) exist:
        receive a base station identifier and measure receive signal strength of radio waves from at least one first base station operating in the first mobile network based on the first SIM, transmit first cell information including the identifier and measured receive signal strength to the first server which determines a first location corresponding to the first cell information, and to receive the first location transmitted from the first server;
        receive a base station identifier and measure receive signal strength of radio waves from at least one second base station operating in the second mobile network based on the second SIM and transmit second cell information including the second base station identifier and corresponding receive signal strength to the second server which determines a second location corresponding to the second cell information, and to receive the second location transmitted from the second server; and
        determine the location of the multi-SIM mobile terminal from the received first location and second location.

16. The system of claim 15, wherein the multi-SIM mobile terminal determines a middle point of the first location and the second location as the location of the multi-SIM mobile terminal.

17. The system of claim 15, wherein if the GPS is unavailable and the first mobile network based on the first SIM is identical to the second mobile network based on the second SIM, the multi-SIM mobile terminal selects one of the first SIM and the second SIM, receives cell information including a base station identifier and strength of radio waves from at least one base station with respect to the selected SIM and transmits the cell information to a corresponding server, receives a location corresponding to the cell information from the server, and determines the received location as the location of the multi-SIM mobile terminal.

18. The system of claim 15, wherein if the GPS is unavailable, the first mobile network based on the first SIM is different from the second mobile network based on the second SIM, and quality of signal transmission and reception through the first mobile network is higher than that of the second mobile network, then the multi-SIM mobile terminal receives cell information including a base station identifier and strength of radio waves from at least one base station with respect to the first mobile network and transmits the cell information to a first server, receives a location corresponding to the cell information from the first server, and determines the location received from the first server as the location of the multi-SIM mobile terminal.

19. The system of claim 15, wherein if the GPS is determined to be available and utilized, the multi-SIM mobile terminal identifies a mobile network for providing an A-GPS service between the first mobile network based on the first SIM and the second mobile terminal based on the second SIM, transmits GPS satellite information confirmed based on information of an occupied base station to a mobile network for providing the A-GPS service and receives a location corresponding to the GPS satellite information from the mobile network for providing the A-GPS service, and determines the location received through the mobile network for providing the A-GPS service as the location of the multi-SIM mobile terminal, and wherein the mobile network for providing the A-GPS service receives GPS satellite information confirmed on the basis of information of an occupied base station from the multi-SIM mobile terminal, calculates a location from the received GPS satellite information, and transmits the calculated location to the multi-SIM mobile terminal.

* * * * *